July 29, 1969     E. C. HUGE     3,457,903
FURNACE FLOOR ARRANGEMENT
Filed Aug. 30, 1967     2 Sheets-Sheet 1
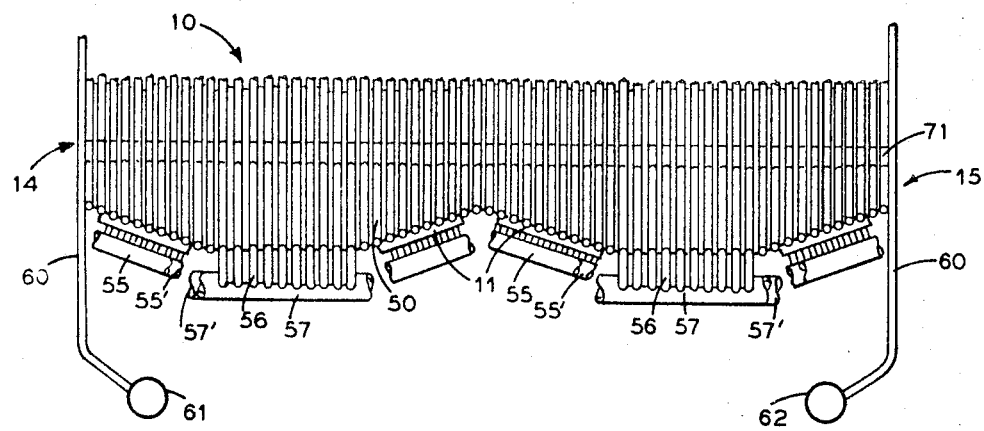
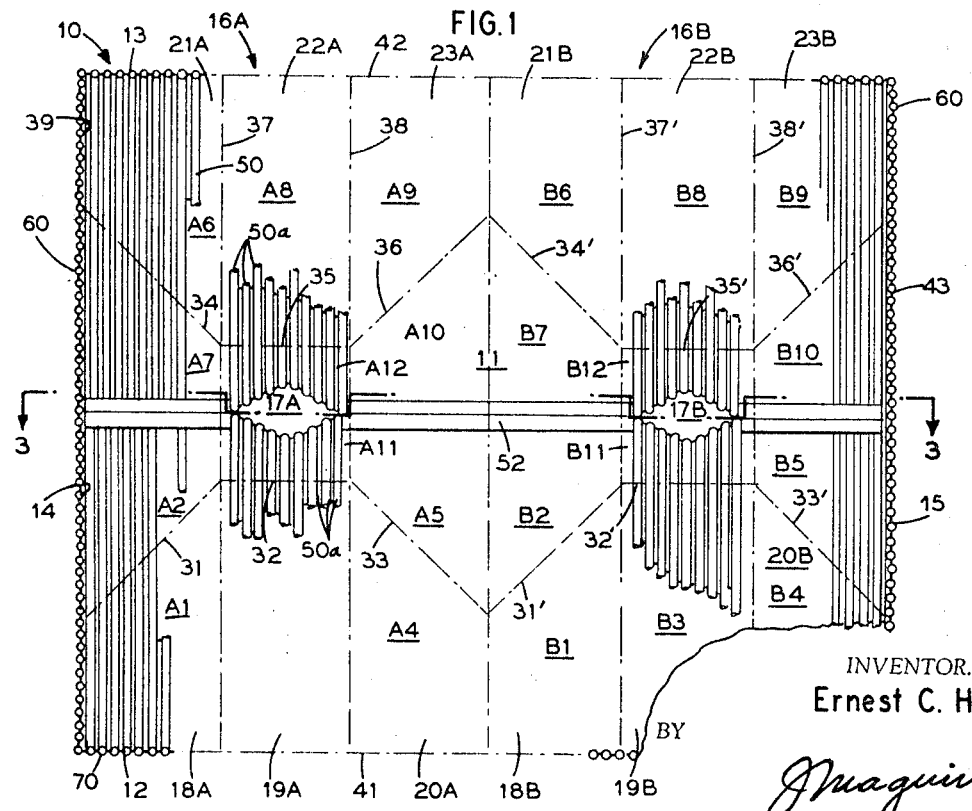
INVENTOR.
Ernest C. Huge
BY Maguire
ATTORNEY July 29, 1969     E. C. HUGE     3,457,903
FURNACE FLOOR ARRANGEMENT
Filed Aug. 30, 1967     2 Sheets-Sheet 2
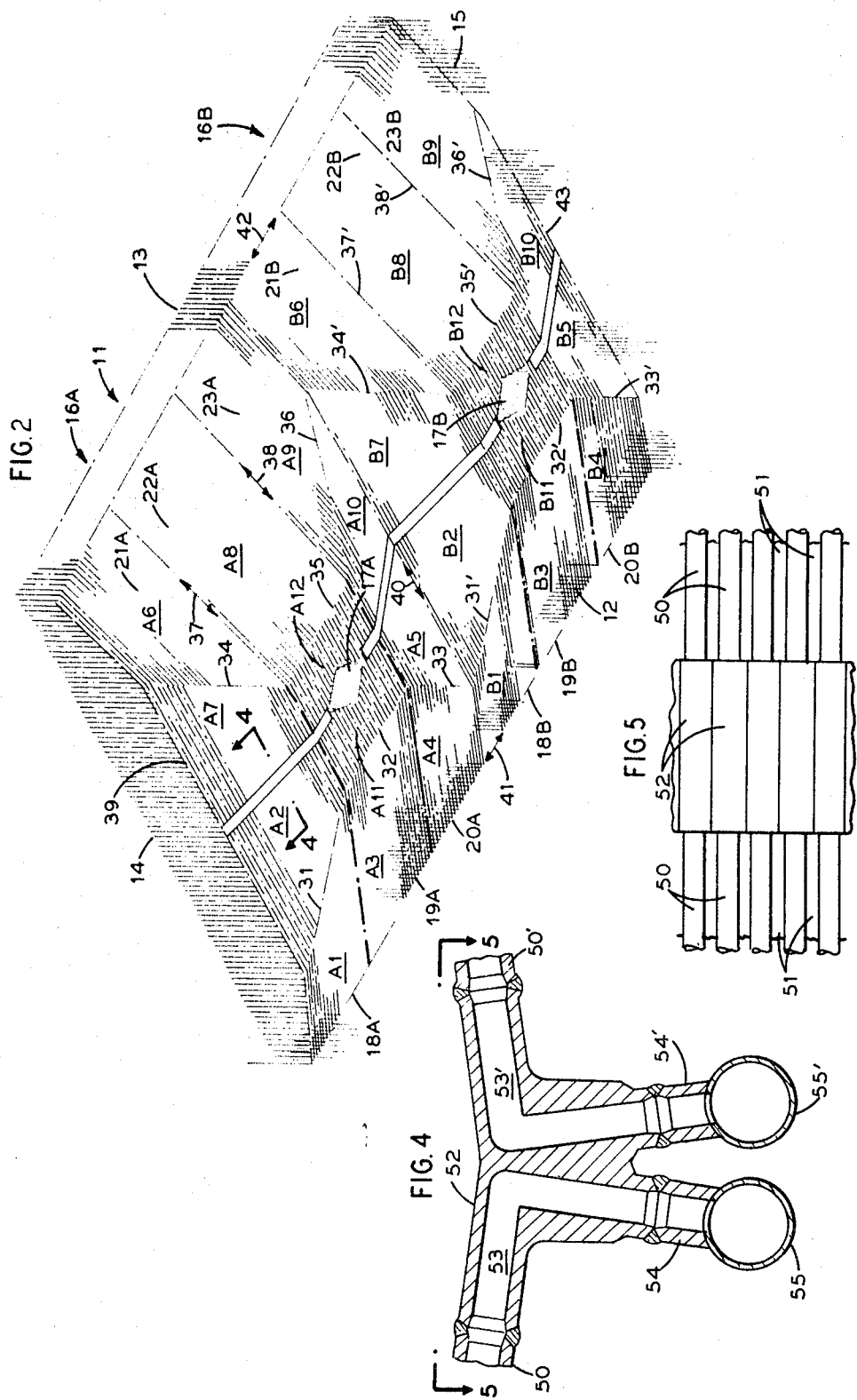

United States Patent Office 3,457,903
Patented July 29, 1969

3,457,903
FURNACE FLOOR ARRANGEMENT
Ernest C. Huge, 283 Castle Blvd., Akron, Ohio 44313
Filed Aug. 30, 1967, Ser. No. 664,437
Int. Cl. F22b 17/00
U.S. Cl. 122—235
10 Claims

ABSTRACT OF THE DISCLOSURE

A furnace floor arrangement having water-tube panel sections bent and joined together to define a furnace floor which slopes downwardly toward each of a plurality of slag drain openings spaced from the furnace wall boundary lines and from floor subdivision lines extending within the furnace.

Background and summary of the invention

The present invention relates in general to furnace floor constructions, and more particularly to a boiler furnace floor made up from water-tube panel sections that are bent and joined together in such a manner as to provide a floor surface that slopes downward around the circumference of each of one or more slag drain openings.

One of the basic problems encountered in continuous slag tap furnaces that are fired with slag-forming fuels is maintaining continuous and effective drainage of molten slag from the entire furnace floor area. With present day use of high capacity steam generating units with correspondingly large furnaces, it is necessary to drain the slag from a plurality of tap openings rather than from a single opening, because the slag production rate naturally increases with boiler-furnace size. It is more practical to use several standard size slag drains and associated collectors each of which have less than the full furnace slag handling capability than to provide a single slag collector sized to handle the entire slag output of the furnace, as would be necessary where only a single slag drain is provided, since with a single slag drain and collector combination, a different collector capacity would have to be provided for each furnace size. Moreover use of multiple drains facilitates slag drainage and minimizes the possibility of slag accumulations freezing in floor areas remote from the slag drain.

In a boiler furnace that is operated for the purpose of generating steam, it is advantageous to use water-tube panel sections for the floor as well as for the walls because the furnace radiant heat is then used beneficially to heat the circulating water and generate steam, the exterior insulation requirements are reduced, and the furnace is easily and economically sealed against furnace pressure and molten slag leakage.

Where water-tube panels are used in a furnace floor, they are preferably arranged and connected to headers in such a manner that no trapping of water or steam occurs in any tube. Such a condition is satisfied where the slope of each tube is either downward or horizontal along the length of the tube going from its highest point to its lowest point.

The invention provides a furnace floor constructed from a plurality of membrane type water-tube panels, such as those described in U.S. Patent 2,993,983 to Carpenter et al., which are bent transversely to the tube centerlines, joined to one another along adjacent lateral edges, with the individual tubes connected endwise at their lower ends to tube fittings in such a manner as to define an inverted frusto-pyramidal floor surface area having an associated slag drain opening at its lowest point and which can be repeated as a modular floor unit in the construction of large furnaces having two or more slag drain openings.

In each water-tube panel, the tubes extend parallel to one another and the panel is bent so that when the floor is assembled, the slope is upwardly along the entire length of each tube and does not rise above horizontal. The tubes of each panel are connected at their upper ends to corresponding tubes in water-tube panels defining a side of the furnace closure wall, and are connected at their lower ends to fittings that lead to headers underneath the furnace floor.

To assure adequate furnace sealing, the adjacent tubes of each panel can be either welded together along their lengths, or welded along their lengths to intermediate spacer bars.

It is therefore, an object of the invention to provide a furnace floor construction that will assure effective, adequate slag drainage from each of one or more preassigned floor areas.

Another object of the invention is to provide a furnace floor construction as aforesaid which can be fabricated from water-tube panels similar to those which can be used for the furnace walls.

A further object of the invention is to provide a furnace floor construction as aforesaid in which the tubes of the floor panels are sloped either downwardly or horizontally along their entire lengths to prevent trapping of water, steam, or steam-water mixture supplied to such tubes.

A further object of the invention is to provide a furnace floor construction as aforesaid in which the tubes of the floor panels are connected to tubes of corresponding furnace wall panels so that the tubes of each floor and wall panel combination can be supplied with fluid from a single set of headers.

Still another and further object of the invention is to provide a furnace floor construction as aforesaid in which the floor panels can be prefabricated for assembly in modular floor area units to construct furnaces of extended floor area with a minimum number of different panel elements.

Other and further objects and advantages of the invention will become apparent from the following detailed description and the accompanying drawing.

Brief description of the drawing

In the drawing:
FIG. 1 is a plan view, partly in section, of the lower portion of a furnace having a water-tube floor constructed in accordance with a preferred embodiment of the invention,
FIG. 2 is a perspective view of the furnace floor shown in FIG. 1,
FIG. 3 is a side elevation view of the furnace shown in FIG. 1 as taken along section line 3—3 therein,
FIG. 4 is a detail section view of the furnace floor shown in FIG. 2 as taken along line 4—4 therein, illustrating typical fittings which connect the floor panel tubes to headers underneath the floor.
FIG. 5 is a top view of the fittings shown in FIG. 4, as taken in the direction indicated by line 5—5 therein.

FIGS. 1–3 exemplify a boiler furnace 10 having a floor 11 generally rectangular in plan form and bounded laterally by a front wall 12, a rear wall 13, a left side wall 14 and a right side wall 15.

Within the enclosure defined by walls 12–15, the floor 11 is subdivided into two generally similar rectangular plan form modular sections 16A and 16B, each provided with a central slag drain opening 17A, 17B respectively.

Each floor section 16A, 16B is made up from a group of six water-tube panels, the panels 18A–23A being joined to one another to form a continuous floor section 16A with surface portions A1–A10 surrounding the slag drain opening 17A and inclined downwardly thereto. The panels 18B–23B are similarly joined to one another to form a continuous floor section 16B with surface portions B1–B10 surrounding the slag drain opening 17B and inclined downwardly thereto.

As can be noted more readily from FIG. 2, the panels 18A–23A, and 18B–23B, are in each case positioned such that their respective surface portions A1–A10 and B1–B10 define the sides of inverted four-sided frusto-pyramidal floor section areas 16A, 16B which surround their corresponding slag drain openings 17A, 17B to facilitate drainage of such molten slag as is collected by such floor sections 16A, 16B when the furnace 10 is fired.

While the furnace floor 11 arrangement of the invention is not necessarily restricted to use with vertical planar furnace walls 12–15, it simplifies the explanation of the invention to consider such walls 12–15 as the boundary planes of the floor 11 and thus it can be said that the floor 11 intersects with and terminates at four vertical boundary planes which are the sides of a generally rectangular prism.

The panels 18A, 19A, 20A, 21A, 22A and 23A are bent along lines 31, 32, 33, 34, 35 and 36 respectively such that panel 18A is divided into two planar surface portions A1 and A2 panel 19A is divided into two planar portions A3 and A11, panel 20A is divided into two planar portions A4 and A5, panel 21A is divided into planar portions A6 and A7, panel 22A is divided into two planar portions A8 and A12, and panel 23A is divided into two planar portions A9 and A10. The bend lines 31–36 are oriented to correspond with the outline edges of the inverted frusto-pyramidal floor section 16A defined by panels 18A–23A. More specifically, the panels 18A and 21A are bounded on one side by a line 37 which lies in a plane parallel to the side walls 14 and 15, such that the portions A2 and A7 of the respective panels 18A and 21A form one inclined side of the frusto-pyramidal floor section 16A, and the remaining panel portions A1 and A6 thereof each form a part of inclined pyramidal sides adjoining the side formed by A2 and A7 along bend lines 31 and 34 respectively.

Similarly, the panels 20A and 23A are bounded on one side by line 38 lying in a plane parallel to walls 14 and 15, and the portions A5 and A10 of panels 20A and 23A define another pyramidal side, opposite to that defined by A2 and A7, the bend lines in this instance being 33 and 36 respectively.

The panels 19A and 22A are bent along respective lines 32 and 35 so that the portion A11 of panel 19A and portion A12 of panel 22A together define the smaller base of frusto-pyramidal floor section 16A and the slag drain opening 17A. Panel 19A adjoins panel 18A along the extension of line 37, and adjoins panel 20A along the extension of line 38, and likewise, panel 22A adjoins panel 21A along line 37 and adjoins panel 23A along line 38.

The portions A1, A3 and A4 of respective panels 18A, 19A and 20A are in coplanar adjoining relation to one another, just as are the portions A6, A8 and A9 of respective panels 21A, 22A and 23A.

Hence, the frusto-pyramidal floor section 16A has a first pair of opposite inclined sides, one defined by A2 and A7, and the other defined by A5 and A10, and a second pair of opposite inclined sides, one of which is defined by A1, A3 and A4, and the other of which is defined by A6, A8 and A9.

In the particular example shown, both pairs of opposite pyramidal sides are inclined at substantially the same angle with respect to the horizontal minor base surface defined by A11 and A12, and the second and longer pair of pyramidal sides extends further outward with respect to the central altitude of floor area 16A than do the first or shorter pair of opposite sides.

Consequently, the panels 18A, 19A and 20A will intersect with and terminate at a horizontal line 41 along the plane of the front wall 12, and the panels 21A, 22A and 23A will intersect with and terminate at a horizontal line 42 along the rear wall 13, such that the lines 41 and 42 are higher in elevation above the plane of A11 and A12 than are the intersection lines 39 and 40 formed by the shorter sides with their respective boundary planes, with the short side defined by A2 and A7 intersecting with wall 14 along line 39, and the short side defined by A5 and A10 intersection with a plane parallel to wall 14 along line 40.

Floor section 16B is similar in construction to 16A and its panels 18B, 19B, 20B, 21B, 22B, 23B and their planar area portions B1, B2, B3, B4, B5, B6, B7, B8, B9, B10, B11, B12 are similar in arrangement and configuration to their similarly numbered counterparts in section 16A. Likewise, in the frusto-pyramidal floor section 16B, the bend lines 31', 32', 33', 34', 35', 36' and junction lines 37' and 38' correspond to their similarly numbered counterparts previously described in connection with section 16A.

The panels 18B and 21B of floor section 16B are connected in adjoining relation to panels 20A and 23A of floor section 16A along the same common boundary plane intersection line 40, so as to provide a continuous floor 11 of extended area, subdivided into two floor sections 16A and 16B, each having a slag drain opening 17A, 17B located at its lowest point or area.

Panels 20B and 23B terminate at and intersect with the plane of the right side wall 15 along a line 43 just as do panels 18A and 21A of floor section 16A terminate at and intersect with line 39 of the left sidewall 14.

The frusto-pyramidal floor areas of sections 16A and 16B adjoin along their shorter sides, which offers a special advantage in that should one of the slag drain openings 17A or 17B become clogged, molten slag will build up, to the height of line 40 along the junction of A5 with B2 and A10 with B7, and then any excess slag will spill over into the adjoining floor section 16A or 16B for drainage through the opening 17A or 17B thereof. In this way, accumulation of a quantity of slag, which could cause structural damage to the furnace 10, is prevented.

As to the details of the water-tube panels 18A–23A and 18B–23B themselves, each panel has a plurality of tubes 50 extending lengthwise in parallel relation to one another and adjacent tubes 50 of each panel are either fused to one another, as by welding, along their lengths or are welded along their lengths to intermediate spacer bars 51, so as to form integral panels which are sealed over their entire area. These tubes 50 serve to carry water and/or steam-water mixture which is heated by radiation from the combustion bases contained within the furnace 10.

To prevent any trapping of fluid in the tubes 50, in each of the panels 18A–23A and 18B–23B, the tubes 50 extend lengthwise in planes parallel to the side walls 14 and 15, and except for those tubes defining the slag drain openings 17A, 17B, i.e. certain tubes 50a in panels 18A, 19B, 22A, 22B, the lower ends of all tubes 50 terminate in a linear assembly of dual-passage fittings 52 which are located generally midway between the front and rear walls 12 and 13, as better seen in FIGS. 1 and 3.

A typical detail view of the connection of the panel tubes 50 to fittings 52 is given by FIGS. 4 and 5. As shown by FIGS. 4 and 5 in conjunction with FIG. 3, the lower ends of tubes 50 in panels 18A, 19A, 20A, 18B, 19B and 20B are received each into a passage 53 on one side of fittings 52 and the lower ends of tubes 50 in panels 21A, 22A, 23A, 21B, 22B and 23B are received each into a passage 53' on the opposite side of fittings 52. The passages 53 communicate the tubes 50 of panels 18A, 19A, 20A, 18B, 19B and 20B with corresponding tubes 54 leading to a header 55 underneath the floor 11. Likewise, passages 53' communicate the tubes 50 of panels 21A, 22A, 23A, 21B, 22B, 23B with corresponding tubes 54′ leading to another header 55′, also underneath the floor 11.

To define the slag drain openings 17A and 17B, the tubes 50a in panels 19A and 22A, and in 19B and 22B are somewhat shorter than the other normal tubes 50 in those panels, and are bent downward and connected to corresponding tubes 56 leading to headers 57 and 57′, underneath floor 11 and spaced back from the slag drain openings 17A and 17B so as not to interfere with the flow of molten slag downward therethrough.

The header 57 associated with floor section 16A communicates with the tubes 50a of panel 19A, and the header 57′ also associated with floor section 16A communicates with the tubes 50a of panel 22A. Likewise, the headers 57 and 57′ associated with floor section 16B communicate with tubes 50a of panels 19B and 22B respectively.

Headers 55 and 57, and 55′ and 57′ can communicate with each other so that one half of the total floor 11 tubes 50 and 50a are supplied with or deliver fluid to one header 55 and 57 combination, and the remaining tubes 50 and 50a are supplied with, or deliver fluid to the other header combination 55′ and 57′.

The furnace front and rear walls 12 and 13, as well as the side walls 14 and 15 can be fabricated from water-tube panels similar to those used for the floor 11. The tubes 60 of the side walls 14 and 15 can extend downward past the floor 11 intersection lines 39 and 43 for connection to headers 61 and 62 underneath the floor 11. The joints between the side wall panels and the floor panels 18A, 21A, and 20B, 23B along lines 39 and 43 are preferably sealed by welding or otherwise.

The tubes 70 of the front and rear walls 12 and 13 are connected at their lower ends to the upper ends of the tubes 50 of the floor panels 18A–23A and 18B–23B. For such purpose, tube bends 71 located in two linear arrays, one along line 41 and the other along line 42, connect corresponding tube 50 ends of panels 18A, 19A, 20A, 18B, 19B, and 20B to tube 70 ends of the front wall 12, and connect corresponding tube 50 ends of panels 21A, 22A, 23A, 21B, 22B and 23B to tube 79 ends of the rear wall 13, to implement the furnace front and rear wall water cooled wall circuitry.

With such an arrangement, water introduced into the headers 55, 55′, 57 and 57′ will flow up through the floor tubes 50 and 50a and thence up the wall tubes 70 while being heated and converted into steam by heat transfer from the furnace combustion gases. The steam generated can subsequently be collected, and superheated for delivery to a steam turbine.

As can be noted more clearly from FIG. 2, there is no danger of any fluid being trapped in the floor tubes 50, 50a because in spite of bends such as occur along lines 31–36, no tube 50 and 50a has any length portion with a slope greater than horizontal. For example, a typical tube 50 in panel 18A is inclined downwardly at a slope equal to that of the frusto-pyramidal floor area 16A front side, throughout the tube 50 length portion from its upper end on line 41 down to the bend line 31. In the tube 50 length portion from bend line 31 to its connection at fitting 52, i.e. across panel 18A portion A2, the tube 50 slope while somewhat reduced can still have a definite upward slope toward bend line 31.

The particular rectangular frusto-pyramidal configuration of floor areas 16A, 16B is conveniently adapted to construction of floors of greater area simply by repeating numbers of adjoining modular frusto-pyramidal floor areas such as 16A, 16B. By making each floor area 16A, 16B symmetric with respect to a central plane through the slag drain opening 17A, 17B, a minimum number of distinct water tube panel configurations will be needed for any given size furnace 10. For example, the panel pairs 18A and 21A, 19A and 22A, 20A and 23A and their counterparts in floor section 16B are similar such that the furnace 10 and any similarly constructed larger furnace with three or more modular floor sections 16A, 16B, needs only three distinct prefabricated floor panel shapes, one for the 18A, 18B, 21A, and 21B panel types, another for the 20A, 20B, 23A, 23B panel types, and the third for the 19A, 19B, 22A and 22B panel types.

From the foregoing it can be appreciated that the invention is susceptible of numerous other obvious modifications and variations to suit the needs of a specific furnace construction. However the invention is intended to be limited only by the following claims in which I have endeavored to claim all inherent novelty.

What is claimed is:

1. A furnace floor arrangement which comprises a plurality of water-tube panels joined to one another to define a continuous furnace floor surface with at least one slag drain opening, said water-tube panels each being bent along a line corresponding to an outline edge of an inverted frusto-pyramid and being positioned together to define floor surface portions which are the sides of such inverted frusto-pyramid and are disposed in surrounding relation to said slag drain opening extending outwardly therefrom to intersect with and terminate at four corresponding boundary planes constituting the sides of a generally rectangular prism.

2. The furnace floor arrangement according to claim 1 wherein said water-tube panels define a four-sided frusto-pyramidal floor area having one pair of longer opposite sides extending further outward with respect to the central altitude thereof than the other pair of shorter opposite sides, said longer opposite sides terminating along horizontal lines of intersection with their associated boundary planes higher in elevation than the intersection lines formed by said pair of shorter opposite sides with their respective boundary planes.

3. The furnace floor arrangement according to claim 2 wherein the tubes of said water-tube panels extend lengthwise in planes approximately parallel to one of said boundary planes, and the tubes of each panel extend lengthwise in parallel relation to one another.

4. The furnace floor arrangement according to claim 1 including a plurality of groups of water-tube panels, the water-tube panels of each group being disposed to define a slag drain opening surrounded by a four-sided inverted frusto-pyramidal floor area having a pair of longer opposite sides and a pair of shorter opposite sides, the frusto-pyramidal floor areas defined by each group of water-tube panels being disposed in adjoining relation to one another to establish a continuous furnace floor of extended area.

5. The furnace floor arrangement according to claim 4 wherein said groups of water-tube panels adjoin one another along their shorter frusto-pyramidal floor area sides, said shorter sides of adjoining water-tube panel groups being disposed for intersection along a terminal line in a common boundary plane whereby molten slag collected in the frusto-pyramidal floor area formed by one group of panels can spill over into the adjoining frusto-pyramidal floor area formed by an adjacent group of panels to limit the height of molten slag collected in any one frusto-pyramidal floor area to the elevation of said terminal line.

6. The furnace floor arrangement according to claim 5 wherein the tubes of said groups of water-tube panels extend lengthwise in planes parallel to said common boundary plane, and the tubes of each panel extend lengthwise in parallel relation to one another.

7. The furnace floor arrangement according to claim 3 wherein tubes contained in water-tube panels defining said longer opposite sides of the frusto-pyramidal floor area terminate at their lower ends in a pattern defining said slag drain opening.

8. The furnace floor arrangement according to claim 3 wherein each tube in said water-tube panels has a length portion inclined downwardly with respect to the horizontal and an adjoining length portion inclined at a slope no greater than zero with respect to the horizontal.

9. The furnace floor arrangement according to claim 3 wherein one pair of opposite sides of said frusto-pyramidal floor area are defined by portions of water-tube panels which are bent to also define portions of the other pair of opposite sides of said floor area.

10. The furnace floor arrangement according to claim 3 including six water-tube panels, four of said panels being bent along lines defining the intersections of the adjoining lateral sides of said frusto-pyramidal floor area, and the remaining two of said six panels being bent along lines to each define a portion of one lateral side of said floor area and a portion of the minor base thereof containing said slag drain opening.

References Cited

UNITED STATES PATENTS

| | | | |
|---|---|---|---|
| 3,247,830 | 4/1966 | Vogler | 122—235 |
| 3,354,870 | 11/1967 | Darlinger | 122—235 |

OTHER REFERENCES

German application No. 1,019,039, Nov. 7, 1957, Zimmermann, et al.

German Application No. 1,198,480, Aug. 12, 1965, Ring et al.

CHARLES J. MYHRE, Primary Examiner